United States Patent
Weng et al.

(10) Patent No.: US 7,925,507 B2
(45) Date of Patent: Apr. 12, 2011

(54) METHOD AND APPARATUS FOR RECOGNIZING LARGE LIST OF PROPER NAMES IN SPOKEN DIALOG SYSTEMS

(75) Inventors: Fuliang Weng, Palo Alto, CA (US); Tobias Scheideck, Palo Alto, CA (US); Zhe Feng, Palo Alto, CA (US); Badri Raghunathan, Palo Alto, CA (US)

(73) Assignee: Robert Bosch Corporation, Broadview, IL (US)

( * ) Notice: Subject to any disclaimer, the term of this patent is extended or adjusted under 35 U.S.C. 154(b) by 579 days.

(21) Appl. No.: 11/483,840

(22) Filed: Jul. 7, 2006

(65) Prior Publication Data
US 2008/0010058 A1   Jan. 10, 2008

(51) Int. Cl.
*G10L 15/18*   (2006.01)
(52) U.S. Cl. ............................. 704/257; 704/9
(58) Field of Classification Search ............... 704/9, 257
See application file for complete search history.

(56) References Cited

U.S. PATENT DOCUMENTS

| | | | | |
|---|---|---|---|---|
| 5,805,710 | A * | 9/1998 | Higgins et al. | 382/101 |
| 6,161,090 | A * | 12/2000 | Kanevsky et al. | 704/246 |
| 7,216,073 | B2 * | 5/2007 | Lavi et al. | 704/9 |
| 2004/0036716 | A1 * | 2/2004 | Jordahl | 345/713 |
| 2004/0148170 | A1 * | 7/2004 | Acero et al. | 704/257 |
| 2005/0234727 | A1 * | 10/2005 | Chiu | 704/270.1 |
| 2007/0067280 | A1 * | 3/2007 | Zhou et al. | 707/5 |

* cited by examiner

*Primary Examiner* — Jakieda R Jackson
(74) *Attorney, Agent, or Firm* — Dergosits & Noah LLP; Geoffrey T. Staniford

(57) ABSTRACT

Embodiments of a name recognition process for use in dialog systems are described. In one embodiment, the name recognition process assigns weighting values to names used in a dialog based on the usage of these names. This process takes advantage of the general tendency of people to speak names, either full or partial, only after they have heard or read these names. Name input is taken in several different forms, including a static background database that contains all possible names, a background database that contains commonly used names (such as common trademarks or references), a database that contains names from a user model, and a dynamic database that constantly takes the names just mentioned. The names are then appended with proper weighting values. A high weight is given to names that have been mentioned recently, a lower weight is given to common names, and a lowest weight is given to names for the ones that have never been used or mentioned.

20 Claims, 4 Drawing Sheets

300

| DATABASE TYPE | COMPOSITION | EXAMPLE WEIGHT | |
|---|---|---|---|
| DYNAMIC | Names Mentioned in Previous Context | 0.6 | 0.9 |
| | Names Inferred by Semantic Relations | 0.4 | |
| STATIC | All Names | 0.05 | 0.1 |
| | Common Domain Names | 0.35 | |
| | User Preferred Names | 0.6 | |

FIGURE 3

METHOD AND APPARATUS FOR RECOGNIZING LARGE LIST OF PROPER NAMES IN SPOKEN DIALOG SYSTEMS

FIELD

Embodiments of the invention relate generally to natural language processing and specifically to recognizing proper names in spoken dialog systems.

BACKGROUND

Spoken language is the most natural and convenient communication tool for people, yet more and more tasks are done using some type of machine or computing device. Dialog systems are systems in which a person speaks to a computer or machine, in order to accomplish a result. With the rise of microprocessor-controlled appliances and equipment, dialog systems are becoming increasingly used to facilitate the man-machine interface in many applications such as computers, automobiles, industrial machinery, home appliances, automated telephone services, and so on. Natural language dialog systems allow a user to enter a request or query in an expression or manner familiar to the user without requiring the user to learn a particular language (or structure) dictated by the computer. Dialog systems process the query and access one or more databases to retrieve responses to the query or cause the computer or machine to perform a particular task.

In many spoken language interface applications, proper names, such as address names, city names, point of interest (POI) names, song names, person names, company names, file names, and so on, are widely used. With data storage capacities in such systems increasing rapidly, people tend to put more and more names into their storage in the form of databases. Accessing the data with spoken language offers people convenience and efficiency if the spoken interface is reliable. It is often the case that the number of proper names used in these applications is very large, and can include many foreign or hard to recognize names, such as street names in a navigation domain, or restaurant names in restaurant selection domain. Moreover, when used in highly-stress environments, such as driving a car, or operating machinery, as well as simply for their convenience, people tend to use more short-handed terms, such as partial proper names and their slight variations. Even in normal conversational contexts, once the identity of an object has been established, later references to that object are typically based on partial names or descriptors, rather than the full name. However, the use of partial names, nicknames, and so on to refer to named objects and people, i.e., any named entity, generally limits the accuracy or effectiveness of natural language processing systems.

In general, present recognition methods on large name lists focus strictly on the static aspect of the names. This is a very challenging problem especially for speech recognition because of the confusability in the large name lists. To add to this problem, in typical speech patterns found in both stressful and non-stressful contexts, name usage for an object often changes through the course of a dialog. In this case, present recognition methods do not adequately recognize different name references to the same object, or they must re-learn different versions of the same name. What is needed, therefore, is a name model generation and name recognition process for spoken interface applications that improves the speech recognition accuracy of names and partial names. What is further needed is a name recognition system that accommodates the dynamic nature of name references in normal speech patterns. With such a generated name model, it is expected to have a better accuracy for large name lists in speech recognition, language understanding, and other components in dialog systems, due to the weight values that put the focus on the names that are more likely to be discussed in the course of a dialog.

BRIEF DESCRIPTION OF THE DRAWINGS

Embodiments of the present invention are illustrated by way of example and not limitation in the figures of the accompanying drawings, in which like references indicate similar elements, and in which:

FIG. 3 is a table that lists the composition of the static and dynamic databases for use with the name model generator component, under an embodiment.

DETAILED DESCRIPTION

Embodiments of a name recognition process for use in dialog systems are described. In one embodiment, the name recognition process assigns weighting values to names used in a dialog based on the usage of these names in the context of the dialog, along with other factors. Name input is taken in several different forms, including a static background database that contains all possible names, a background database that contains commonly used names (such as common trademarks or references), a name database derived from a user profile or model, and a dynamic database that constantly takes names that have been recently mentioned. The names are then appended with proper weighting values. A high weight is given to names that have been mentioned recently, a lower weight is given to common names, and a lowest weight is given to names for the ones that have never been used or mentioned. This process facilitates the identification of proper names and partial proper names with high recall and precision, and can therefore greatly increase the usability of spoken dialog systems. Embodiments can be applied in various application areas ranging from dialog systems to information extraction. The described name recognition process takes into account of the temporal and context effect when names are used, and provides performance advantages over recognition methods on large name lists that focus on the static aspect of names.

In one embodiment, a name model generator module incorporated in the front-end of a natural language processing system helps to solve the problem of large lists of proper names, and reduces misrecognition of names for other words. It narrows the focus of the speech and/or natural language recognition units to selected lists based on context information of the speech. This process also accommodates the general tendency of people to speak names, either full or partial, only after they have heard or read these names, and improves and speeds recognition of partial names.

In the following description, numerous specific details are introduced to provide a thorough understanding of, and enabling description for, embodiments of the name recognition process in spoken dialog systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
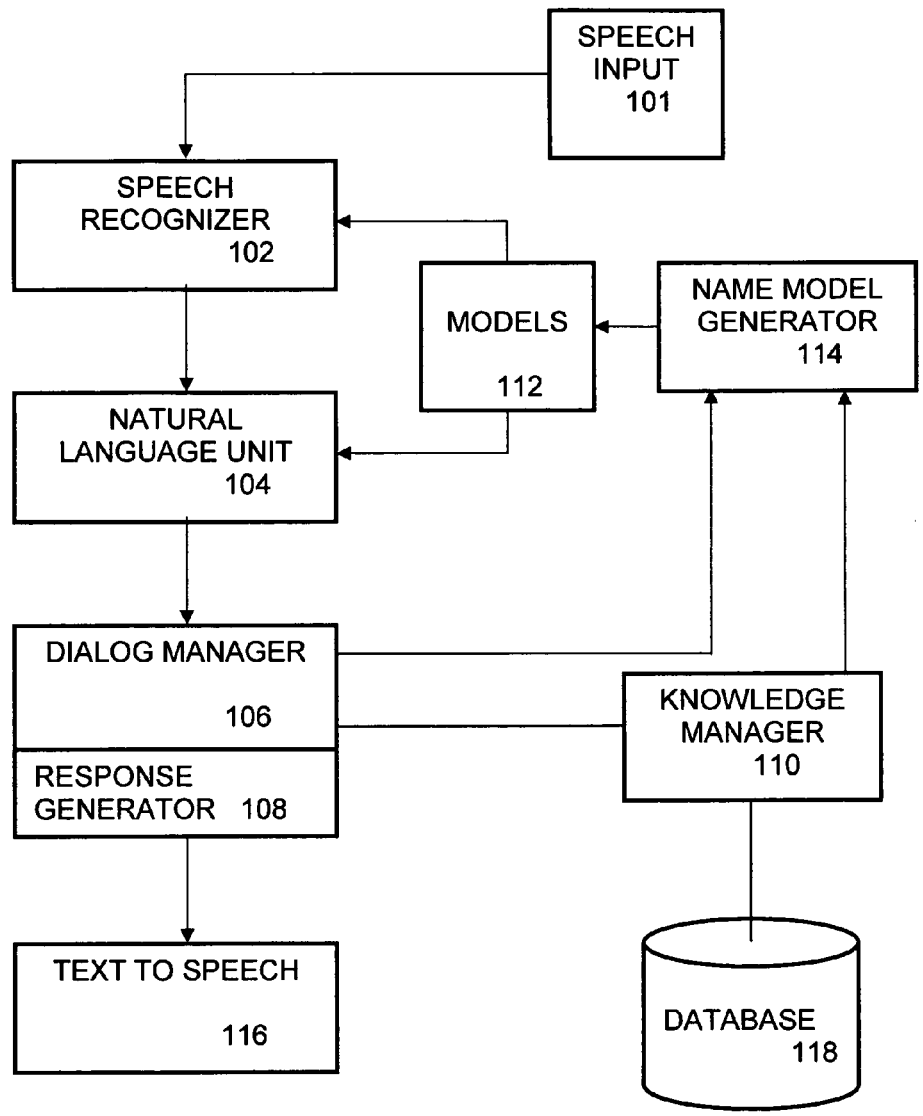
FIG. 1 is a block diagram of a dialog system including a name model generator component, according to an embodiment.

FIG. 1 is a block diagram of a natural language processing system that includes an identification process for a large list of names, according to an embodiment. System 100 illustrated in FIG. 1 comprises a front-end system and a back-end system that includes a large database 118 that stores a large number of names. Throughout the description, the term "name" is used to denote any type of entity label, such as the name of a person, place or thing, or any other descriptor or label for an object or entity. In general, depending upon the domain or dialog system application, the number of names in database 118 could be very large, e.g., on the order of tens to hundreds of thousands of names. To improve the recognition accuracy of names in the user utterance, the large name list is pared down into a smaller list of names with weight values attached based on the context of the names used in the input speech of recent conversations. Names outside of the smaller list are assigned a weight value of zero. Further speech recognition and language understanding processes then use the smaller list in the recognition and understanding process. The use of the smaller list limits the number of possible matches from possibly tens of thousands of names (in the original database) to tens or hundreds of names (in the smaller list). In this manner, context and dialog strategies can be incorporated in constraining name candidates for speech recognition, language understanding, and other later stage processing.

For the embodiment of system 100, the front-end includes a speech recognizer (SR) unit 102, a natural language understanding (NLU) unit 104, and a dialog manager (DM) unit 106. The speech recognizer unit 102 receives speech input 101 in the form of acoustic signals at one or more inputs, which can come from one or more users (speakers) in the form of user utterances. The natural language understanding unit 104 is coupled to the SR unit 102 and receives a sequence or lattice of words with attached labels, such as confidence scores. The NLU unit 104 outputs a structured meaning representation, which may use class-based grammars and/or class-based statistical models trained on in-domain and/or domain-independent linguistic data and one or more available knowledge bases. Optimized output is provided from the natural language unit to the dialog manager unit 106. The DM unit 106 maintains a list of names mentioned in conversation from both user and system, interprets the input representations in context and issues appropriate instructions to other modules of the dialog system based on the context and the knowledge base.

A knowledge manager (KM) unit 110 is coupled to the DM unit 106, and serves as an interface to different knowledge sources (e.g., database 118) or knowledge bases by managing the general ontology, the domain-specific ontology, and the database for any active domain. For the embodiment of FIG. 1, the KM unit 110 essentially makes use of ontology to enforce a structure on the database 118. Although a discrete KM unit is shown in FIG. 1, it should be noted that in some implementations, the KM unit may not actually be required, depending upon the application and system constraints and requirements, such as if the dialog manager performs a direct database query. Likewise, certain other components not shown can also be included depending upon actual implementation details and system requirements. One such component is a device manager that monitors the possible states of any attached devices, and controls their operation.

As shown in system 100, the dialog manager unit 106 includes a response generator module 108. The response generator module 108 takes the output from DM unit 106 and organizes it in a succinct and grammatical way for output by the attached text-to-speech (TTS) unit 116. The TTS unit 116 receives the organized content from the response generator module 108 (e.g., word sequence with tagged features) and produces speech waveforms. The response generator module 108 can be considered a specific type of natural language generator in which the output comprises responses to user inquiries. In a more general embodiment, any type of natural language generator can be used in place of the response generator module 108. The names the response generator sends to the TTS unit are also sent to the name model generator module via the DM unit.

For the embodiment of FIG. 1, a name model generator module 114 is incorporated in the front-end of the natural language processing system 100. Name input to the name model generator unit 114 is taken from two basic databases that are built by input from the database 118 and the DM unit 106. The first database is a static database that contains all possible names, commonly used names (such as common trademarks or references), or names frequently used by the user (such as derived from a user profile or model), and is generally sourced by database 118. The second database is a dynamic database that constantly takes the names in the context of the utterance (such as names just mentioned) from the DM unit 106. The name model generator unit 114 builds a name list that contains full and partial names that are appended with proper weighting values depending on the context in which the names are used and other characteristics of the names. A high weight is given to names that have been mentioned recently, a lower weight is given to common names, and a lowest weight is given to names that have not been used. The name model generated by the name model generator 114 is used to build one or more models 112 that are used by either or both of the speech recognizer unit 102 and natural language understanding unit 104. In another embodiment the name model generator 114 provides a smaller set of names based on the context of user and system utterances. This smaller model accommodates for possible vocabulary size limitations of the speech recognizer 102.

Figure 2:
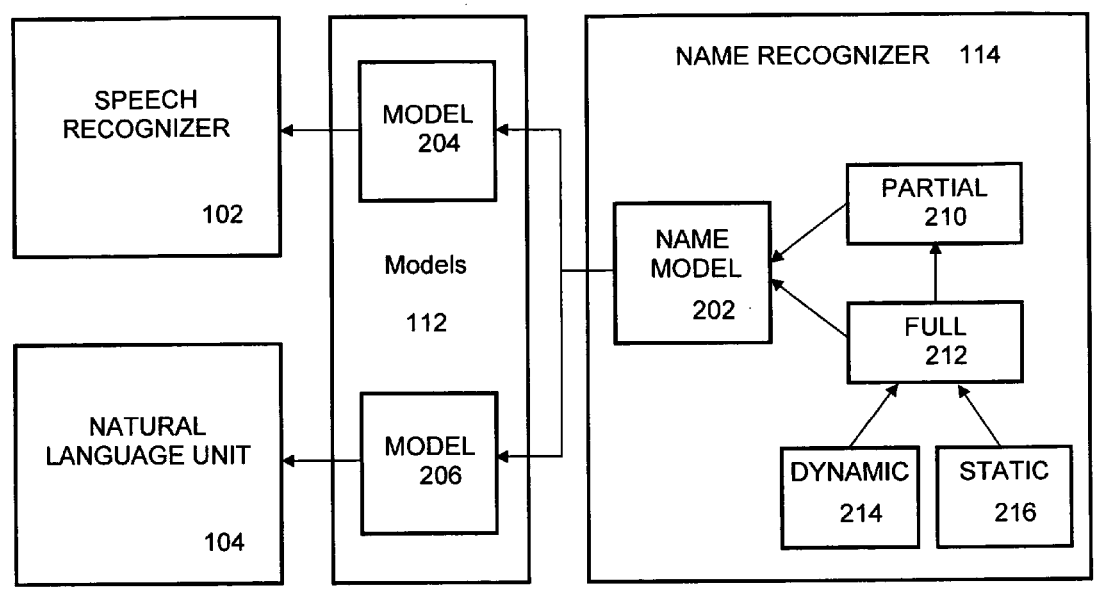
FIG. 2 is a block diagram of a name model generator module for large name lists, according to an embodiment.

FIG. 2 is a block diagram of a name model generator module 114 for large name lists, according to an embodiment. The name model generator includes two database sources, dynamic 214 (from the DM unit) and static 216 (from the KM unit), that are used to generate a list 202. The static source 216 comprises all names, common domain names (where a domain is a type of application), and user preferred names from a user profile or model. The user-preferred names can either be explicitly user specified, or derived by long-term observation of user interests. In general, static entries are either pre-defined or existing in the database 118, or are built-up over time and added to database 118. The dynamic database 214 comprises all names mentioned by the user or the system during the course of dialog or in an utterance, or names inferenced by semantic relations in a user or system utterance. In general, dynamic entries are based on a current instance of an ongoing dialog. FIG. 3 is a table 300 that lists the composition of the static and dynamic databases for use with the name model generator component, under an embodiment. Column 302 delineates the two main database types, dynamic and static; and column 304 describes the possible types of database entries for these two types of databases.

As shown in FIG. 2, the dynamic and static databases generate a set of full names 212. From the full names 212, partial names 210 are derived. Full and partial names are typically marked with different labels in the database 118. The partial names can be any known or accepted nickname or partial name for known names, such as "Bill" for "William," or "US," "United States," or "America" for "United States of America," and so on. The partial names can be generated by a proprietary partial name generator, or a partial name generator known in the art. The partial names can be pre-defined, such as in a partial name list that includes all possible partial name versions of the listed full names. Alternatively, partial names can be derived during the course of dialogue using knowledge-based derivation. For example, as a conversation develops, partial names are often used in place of full names, and the partial name list can grow as these names are used in conversation. Partial names can also be derived using pre-defined rules. These can include rules for using the first two or three letters of a name, using the first initials of a compound name, using every other word in a compound name, and so on. In another embodiment, the partial names 210 are derived using an n-gram model produced through statistical means. Such a method is described in U.S. Patent Application No. 20060074670, entitled "Method and System for Interactive Conversational Dialogue for Cognitively Overloaded Device Users", which is assigned to the assignee of the present application, and which is hereby incorporated by reference in its entirety.

The full and partial names are then combined to produce name model 202. The name model can be represented by a list, a finite state machine, or some other context-free model. The name model 202 is then used together with other sub models to construct one or more models 112. As shown in FIG. 2, model 206 is used for the natural language understanding unit 104, and model 204 is used for speech recognizer unit 102. Alternatively, the same model can be used by both the speech recognition unit and the natural language unit. For the embodiment of FIG. 2, the model 204 for the speech recognizer is a class-based n-gram model or class-based grammar in finite state, context-free, or other forms that includes the names from list 202. The derivation of partial names ensures that the recognition process includes variations of the full names that were originally provided to the system.

In one embodiment, the names in list 202 are assigned weights depending upon the databases from which they were derived. In general, names from the dynamic database are weighted higher than names from the static database. Weights can be assigned based on any appropriate scale, such as 0 to 100%, or any similar scale. Table 300 of FIG. 3 includes an example of weights for the different name types in column 306. For this example, for names provided by the dynamic database 214, names mentioned in a previous context of an utterance are given the highest weight (60%), while those that can be inferenced by semantic relations in an utterance are give a lower weight (40%). For names provided by the static database 216, little weight is given to common names (35%), slightly more weight is given to user-preferred names (60%), and very little or no weight is given to names that are in the database, but do not fall into any of the other categories (5%). Furthermore, as a global adjusting factor, the dynamic database 214 as a whole can be weighted higher (90%) as compared with the static database 216 (10%). An alternative embodiment can take into account the discriminative factor in deciding the weights for each word in the names. Variations of adjusting the membership of the different name categories can also be used, such as taking into account the names used in recent dialog sessions.

The name model 202 ultimately contains a subset of the proper names contained in database 118. The overall weights assigned to the names can be used to limit the active vocabulary by removing the entries of database 118 with the lowest weight until either all entries have at least a certain weight, or a required number of entries are reached. Alternatively, list 202 can correspond to database 118 with names below a certain probability assigned a weight of zero. In this manner, context and additional information is used to assign weights to improve the performance of the speech recognizer and natural language understanding unit by constraining name candidates for the speech recognition and natural language understanding units.

In one embodiment, the internal data relationship (or the semantic relationship) in previous context and current utterances can also be used for constraining the ultimate set of names. In one implementation, a name model generator can be used in a dialog system for a music playback system. In this case the name could refer to a playable object that can be referenced by artist, song title, album name, and so on. For this example, if "Madonna" has been hypothesized for a previous utterance, all songs names, album names, etc. by the artist "Madonna" will be assigned a higher weight because of their inherent semantic relationship. This can be done for multiple utterances from the dialog history and multiple hypotheses for every utterance using the rank, recency, elapsed time or confidences from speech recognition or language understanding for the weight determination. Constraints can also be derived from dialog context. For example, in the case of being asked a question, the user is more likely to answer with names corresponding to the question.

In one embodiment, list 202 comprises a single list of names, each with a weight attached. The list could be ordered in descending or ascending order of weight value, or it can be randomly ordered. Alternatively, list 202, can comprise multiple sublists, with each sublist containing a number of names grouped by relative weight. Thus, for example, sublist 1 could contain the top 10% most likely names, sublist 2 could contain the next most likely names, and so on.

The identified names contained in list 202 may also go through a boundary correction stage that uses wider within-utterance context to better predict the true names in the word sequences if simple but robust statistical models, (e.g., class-based n-gram models) are used. One such method is described in U.S. Patent Application No. 20060015484, entitled "Method and Apparatus for Providing Proper or Partial Proper Name Recognition", which is assigned to the assignee of the present application, and which is hereby incorporated by reference in its entirety. Anchoring on the confident portions of the utterance with clarification dialogs can make use of the semantic relation internal in the data to narrow down the types of names for recognition.

Figure 4:
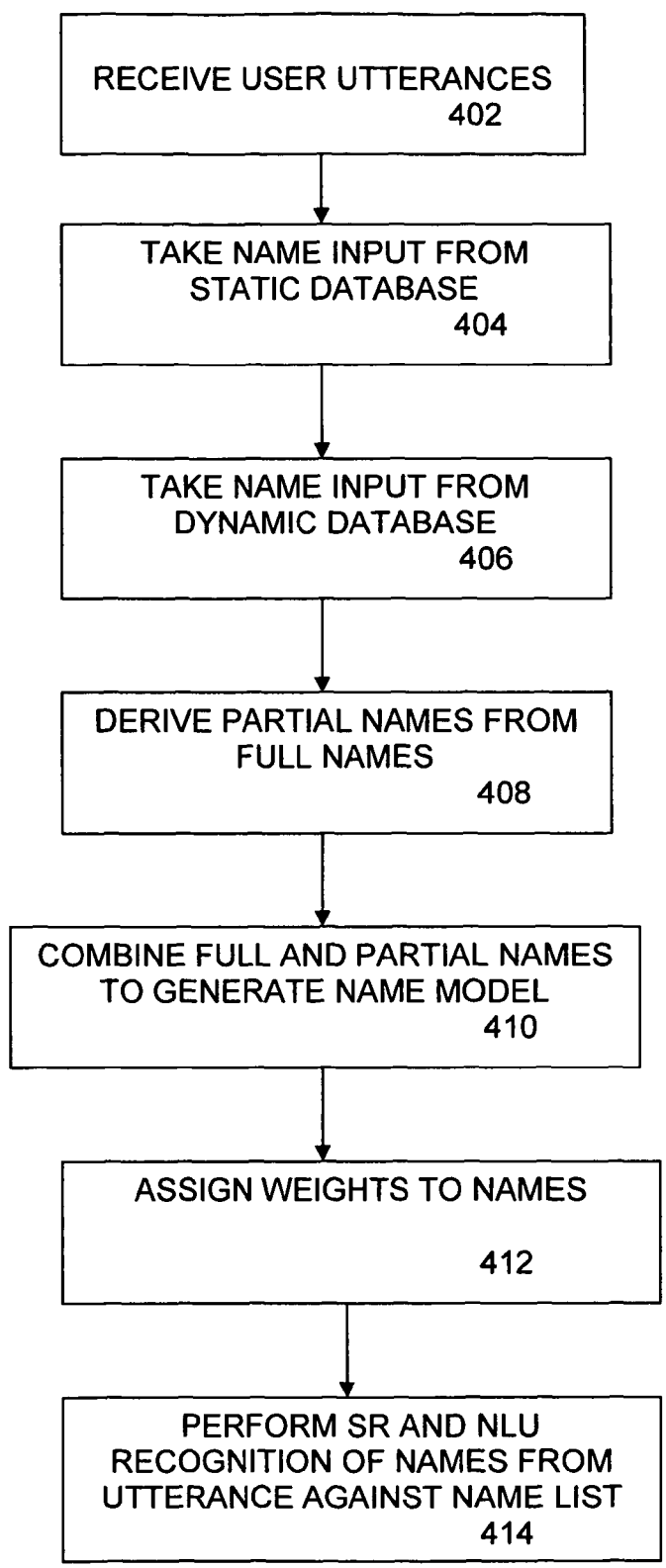
FIG. 4 is a flowchart that illustrates a method of performing natural language processing on spoken dialog using a name model generator, under an embodiment.

FIG. 4 is a flowchart that illustrates a method of performing natural language processing on spoken dialog using a name model generator, under an embodiment. In step 402, a user utterance is received in the speech recognizer unit of the natural language processing system. Names within the utterance will be processed and recognized by comparing the input names to names provided by a knowledge base. The name model generator unit serves to improve the accuracy of the speech recognizer and natural language understanding unit of the system by constraining the name candidates based on the context of the utterance. In step 404, name input is taken from a static database. The static database can comprise all names, common names, and user-preferred names. Name input is also taken from a dynamic database, step 406. The dynamic database includes names mentioned in the same or previous utterances or dialog, as well as names that can be inferred through semantic relationships evident in the utterance.

For all of the full names provided by the static and dynamic databases, partial or alternative versions of the name are derived, step 408. The full and partial names are then combined to generate a name model, step 410. Weights are assigned to the names in the name model depending upon the classification within the dynamic and static databases, step 412. In general, names used or inferred through use in the same dialog (i.e., dynamic database names) are assigned a relatively higher name than names provided by the static database. Recognition of the names within the utterance is then performed with respect to the names stored in the name list and the models generated by the list for the speech recognizer and/or natural language understanding unit, step 414.

Although embodiments have been described with respect to optimizing recognition in a speech recognizer and natural language understanding module of a spoken dialog system for names (entity labels), it should be understood that similar methods can be used with regard to other areas of speech, such as noun phrases, verb phrases, commands, idiomatic expressions, and so on. Likewise, embodiments can be directed to non-spoken dialog systems that rely on text input, or other similar non-verbal input means. In such an embodiment, the speech recognizer unit 102 can be configured to accept text or similar input, instead of, or as well as speech input 101.

Embodiments can be applied in various application areas ranging from dialog systems to information extraction. Embodiments can also be used in speech recognition systems used in human-machine interfaces, such as navigation systems, robotic control, industrial process control, and the like; as well as used in various different applications, industries or industry segments, such as automobiles, airplanes, hand-held devices, cell-phones, and the like. For example, implementations of the name recognition system can provide a highly reliable technique for the automotive industry because of the special requirements of such as system, that is a setting in which drivers are in an eye-busy and hand-busy situation and may resort to referring to objects using partial or nicknames only. One embodiment of the disclosed system may be a dialog system that can be speech-based with user input and system output provided as spoken language, or it can be text-based with alphanumeric text input and output through a computing device or similar interface device.

Aspects of the name model generator method described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the content optimizer include: microcontrollers with memory (such as EEPROM), embedded microprocessors, firmware, software, etc. Furthermore, aspects of the disclosed method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the name model generator method is not intended to be exhaustive or to limit the embodiments to the precise form or instructions disclosed. While specific embodiments of, and examples for, proper name recognition in dialog systems or other human-machine interaction systems, or machine learning systems are described herein for illustrative purposes, various equivalent modifications are possible within the scope of the described method, as those skilled in the relevant art will recognize.

The elements and acts of the various embodiments described above can be combined to provide further embodiments. These and other changes can be made to the name model generator method in light of the above detailed description.

In general, in the following claims, the terms used should not be construed to limit the name model generator method to the specific embodiments disclosed in the specification and the claims, but should be construed to include all operations or processes that operate under the claims. Accordingly, the name model generator method is not limited by the disclosure, but instead the scope of the recited method is to be determined entirely by the claims.

While certain aspects of the disclosed method are presented below in certain claim forms, the inventor contemplates the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A method of optimizing the performance of speech recognition and language understanding in a natural language processing system, comprising:
    compiling a first set of full names based on usage of the names during the course of a current spoken dialog session, wherein the first set of full names is stored in a dynamic database, wherein the dynamic database is sourced from data generated by a dialog manager unit in the natural language processing system and that receives input from a natural language understanding unit to interpret input representations in context;

compiling a second set of full names based on presence in a pre-defined knowledge base that is built up from dialog sessions other than the current dialog session, wherein the second set of full names is stored in a static database, wherein the static database is sourced from data generated by a knowledge manager unit in the natural language processing system and that interfaces to one or more knowledge sources;

deriving partial names for one or more of the names of the first set of full names and the second set of full names;

combining the partial names and the first and second set of full names to generate a name model;

assigning weight values to each of the names of the name model, wherein the relative weights depend on the usage of the names in the current dialog session and the presence in the pre-defined knowledge base, and wherein name entries in the dynamic database are weighted higher than name entries in the static database; and removing from an active vocabulary list those name entries with weight values below a defined minimum value to constrain name candidates processed by the natural language processing system.

2. The method of claim 1, wherein the first set of full names comprise at least one of names that were previously uttered by the user or the system in the dialog, names that can be inferred through semantic indicators in the dialog.

3. The method of claim 2, wherein the second set of full names comprise at least one of all names in the knowledge base, common names recognized by a substantial portion of a population, and names historically associated with a user of the system.

4. The method of claim 3, further comprising:
generating a first model from the name model for use by a speech recognizer nit of the system; and
generating a second model from the name model for use by a natural language understanding unit of the system.

5. The method of claim 4, wherein the first model is one of a class-based n-gram model, a class-based finite state model, and a class-based context-free model.

6. The method of claim 1, wherein the dynamic database comprises names mentioned in a previous context of the current dialog session or names inferred by semantic relations, and the static database comprises all names or common domain names or user preferred names.

7. The method of claim 1 wherein the partial names are derived by a process comprising at least one of pre-defining partial names based on the full names, learning the partial names through a knowledge-based system, applying a set of pre-defined rules to the full names to derive the partial names, and applying an n-gram model produced through statistical means.

8. A method implemented by a processor-based system for recognizing names in spoken dialog comprising:
receiving an input utterance from a user in a speech recognizer;
generating a structured meaning representation of the input utterance based on a statistical model trained on linguistic data and a knowledge base in a natural language understanding unit coupled to the speech recognizer, wherein the knowledge base contains a plurality of names used in the input utterance; and
generating a name model based on context information related to the input utterance and the presence of names in the knowledge base in a name model generator module coupled to the speech recognizer and natural language understanding unit; wherein the name model is generated by
compiling a first set of full names based on usage of the names during the course of a current dialog session, wherein the first set of full names is stored in a dynamic database, wherein the dynamic database is sourced from data generated by a dialog manager unit in the natural language processing system and that receives input from a natural language understanding unit to interpret input representations in context;
compiling a second set of full names based on presence in a pre-defined knowledge base that is built up from dialog sessions other than the current dialog session, wherein the second set of full names is stored in a static database, wherein the static database is sourced from data generated by a knowledge manager unit in the natural language processing system and that interfaces to one or more knowledge sources; and
deriving partial names for one or more of the names of the first set of full names and the second set of full names, and combining these names to generate the name model, wherein each of the names is assigned a weight value depending on the usage of the names in the current dialog session and the presence in the pre-defined knowledge base, and further wherein name entries in the dynamic database are weighted higher than name entries in the static database, and further wherein, name entries with weight values below a defined minimum value are removed from an active vocabulary list to constrain name candidates processed by the natural language processing system.

9. The method of claim 8, wherein the name model generator module comprises an input stage configured to receive a first plurality of names from a dynamic database and a second plurality of names from a static database.

10. The method of claim 9, wherein the dynamic database includes a first set of full names selected from the group consisting essentially of: names that were present in the previous utterances from both user and system, and names that can be inferred through semantic indicators in the previous utterances from both user and system.

11. The method of claim 10 wherein the static database includes a second set of full names selected from the group consisting essentially of: all names in the knowledge base, common names recognized by a substantial portion of a population, and names historically associated with a user of the system.

12. The method of claim 11, further comprising a partial name derivation unit configured to derive partial names from one or more of the names from the first set of full names and the second set of full names.

13. The method of claim 12, wherein the first set of full names and the second set of full names and the partial names are combined to generate a name model.

14. The method of claim 13, wherein the names in the name model are each assigned a weight value, and wherein the relative weights depend on the usage of the names in the user utterance and the presence in the knowledge base.

15. The method of claim 14 wherein a higher relative weight is assigned to names from the dynamic database and to partial names derived from names in the dynamic database.

16. The method of claim 15 wherein the name model is represented by a list, a finite state machine, or an alternate type of context-free model.

17. A non-transitory, machine-readable medium embodied on a physical structure, including instructions which when executed in a processing system perform the following executable steps:
  compiling a first set of full names based on usage of the names during the course of a current spoken dialog session, wherein the first set of full names is stored in a dynamic database, wherein the dynamic database is sourced from data generated by a dialog manager unit in the natural language processing system and that receives input from a natural language understanding unit to interpret input representations in context;
  compiling a second set of full names based on presence in a pre-defined knowledge base that is built up from dialog sessions other than the current dialog session, wherein the second set of full names is stored in a static database wherein the static database is sourced from data generated by a knowledge manager unit in the natural language processing system and that interfaces to one or more knowledge sources;
  deriving partial names for one or more of the names of the first set of full names and the second set of full names;
  combining the partial names and the first and second set of full names to generate a name model;
  assigning weight values to each of the names of the name model, wherein the relative weights depend on the usage of the names in the current dialog session and the presence in the pre-defined knowledge base, and wherein name entries in the dynamic database are weighted higher than name entries in the static database; and
  removing from an active vocabulary list those name entries with weight values below a defined minimum value to constrain name candidates processed by the natural language processing system.

18. The non-transitory medium of claim 17, wherein the first set of full names comprise at least one of names that were previously uttered by the user or the system in the dialog, names that can be inferred through semantic indicators in the dialog, and wherein the second set of full names comprise at least on of all names in the knowledge base, common names recognized by a substantial portion of a population, and names historically associated with a user of the system.

19. The non-transitory medium of claim 17, further comprising instructions that:
  generate a first model from the name model for use by a speech recognizer unit of the system; and
  generate a second model from the name model for use by a natural language understanding unit of the system.

20. The non-transitory medium of claim 19, wherein a higher relative weight is assigned to names from the first set of full names and to partial names derived from names of the first set of full names.

* * * * *